May 3, 1955 W. BISSET ET AL 2,707,567
STACKER AND LOWERER DEVICE
Filed Dec. 15, 1948 16 Sheets-Sheet 3

INVENTORS
WILLIAM BISSET
WILFRED STANLEY FROST
BY
ATTORNEY

May 3, 1955 W. BISSET ET AL 2,707,567
STACKER AND LOWERER DEVICE
Filed Dec. 15, 1948 16 Sheets-Sheet 5

INVENTORS –
WILLIAM BISSET
WILFRED STANLEY FROST
BY
*Louis N. Caveau*
ATTORNEY

INVENTORS
WILLIAM BISSET
WILFRED STANLEY FROST

INVENTORS
WILLIAM BISSET
WILFRED STANLEY FROST
BY
Louis N. Cameau
ATTORNEY

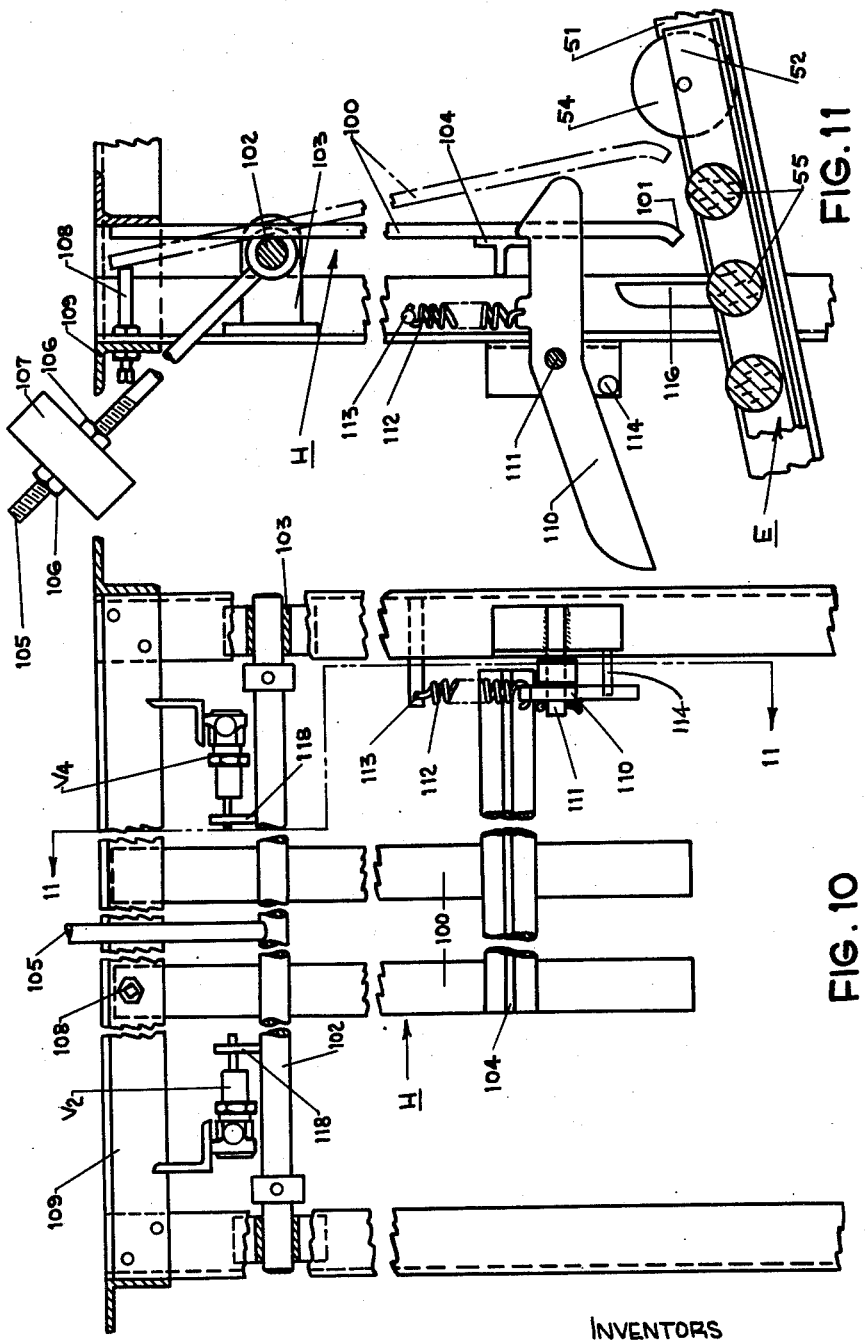

May 3, 1955   W. BISSET ET AL   2,707,567
STACKER AND LOWERER DEVICE
Filed Dec. 15, 1948   16 Sheets-Sheet 9

INVENTORS
WILLIAM BISSET
WILFRED STANLEY FROST
BY
ATTORNEY

May 3, 1955 W. BISSET ET AL 2,707,567
STACKER AND LOWERER DEVICE
Filed Dec. 15, 1948 16 Sheets-Sheet 10

INVENTORS
WILLIAM BISSET
WILFRED STANLEY FROST
BY
ATTORNEY

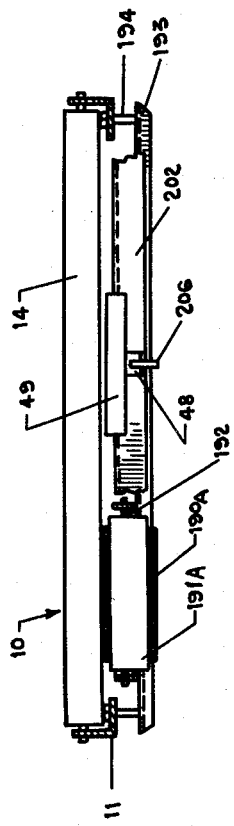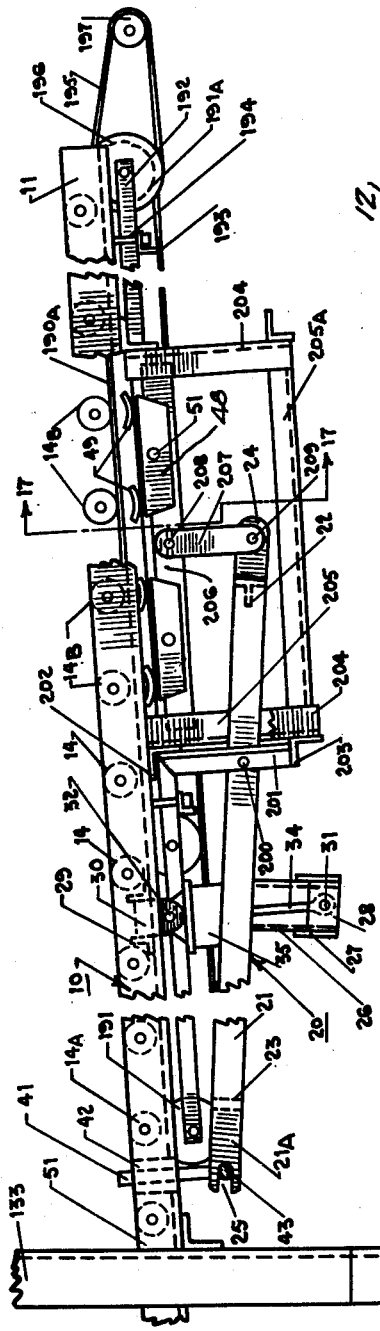

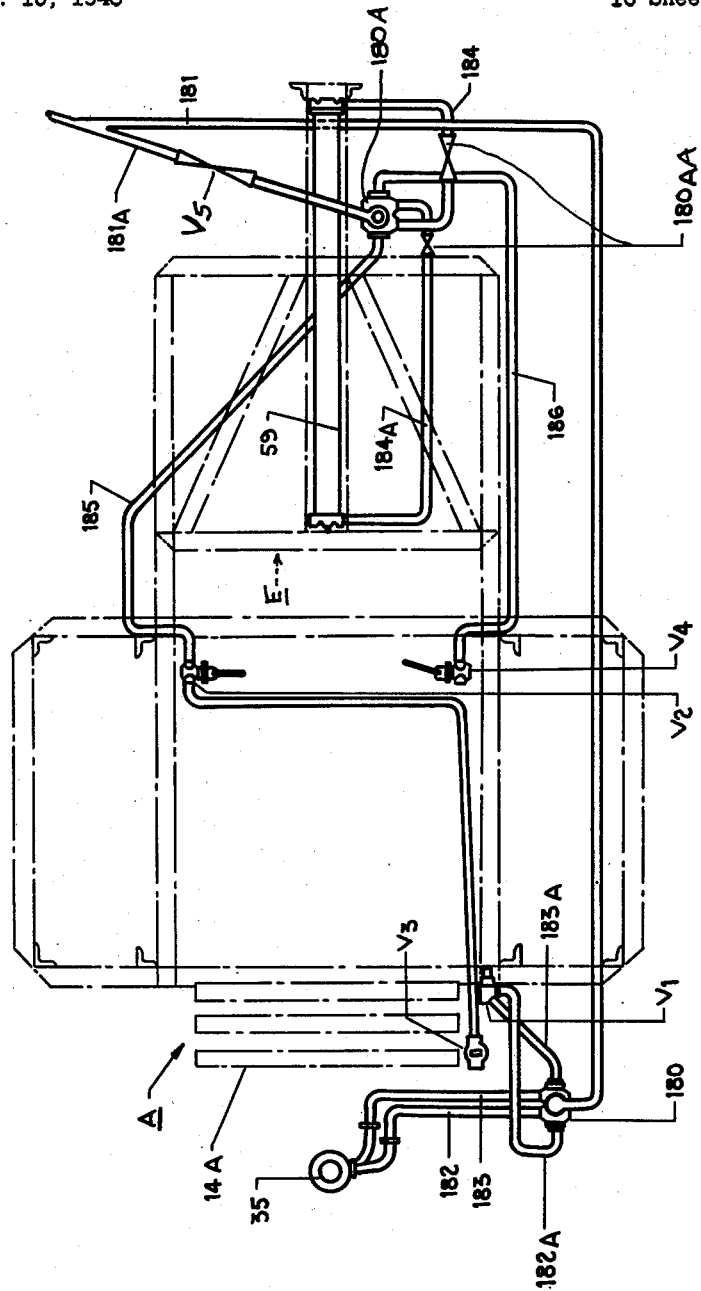

May 3, 1955 W. BISSET ET AL 2,707,567
STACKER AND LOWERER DEVICE
Filed Dec. 15, 1948 16 Sheets-Sheet 13
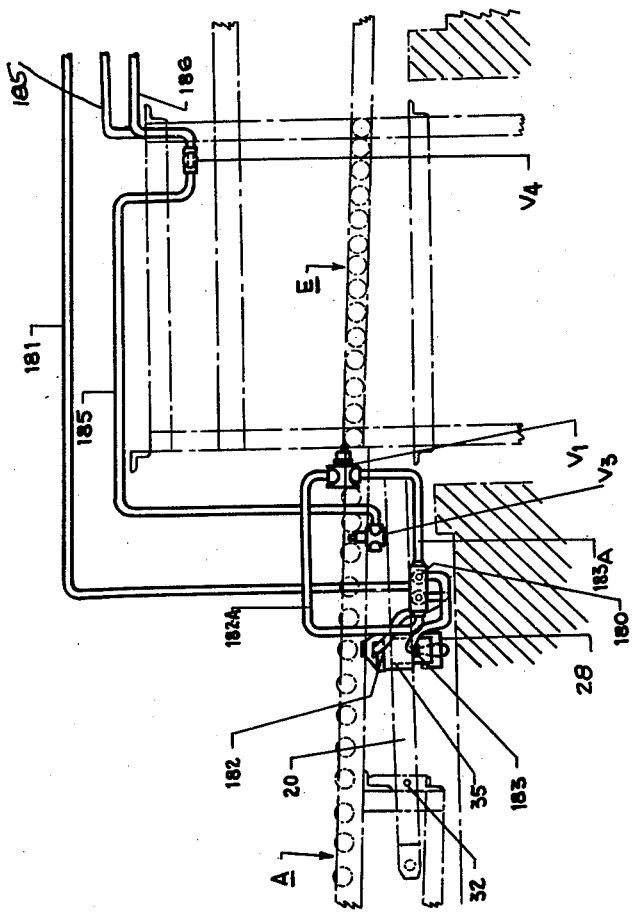
INVENTORS
WILLIAM BISSET
WILFRED STANLEY FROST
BY
ATTORNEY

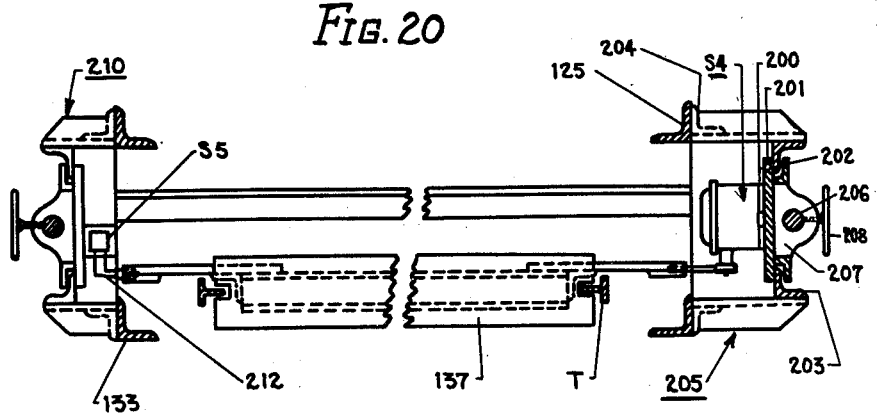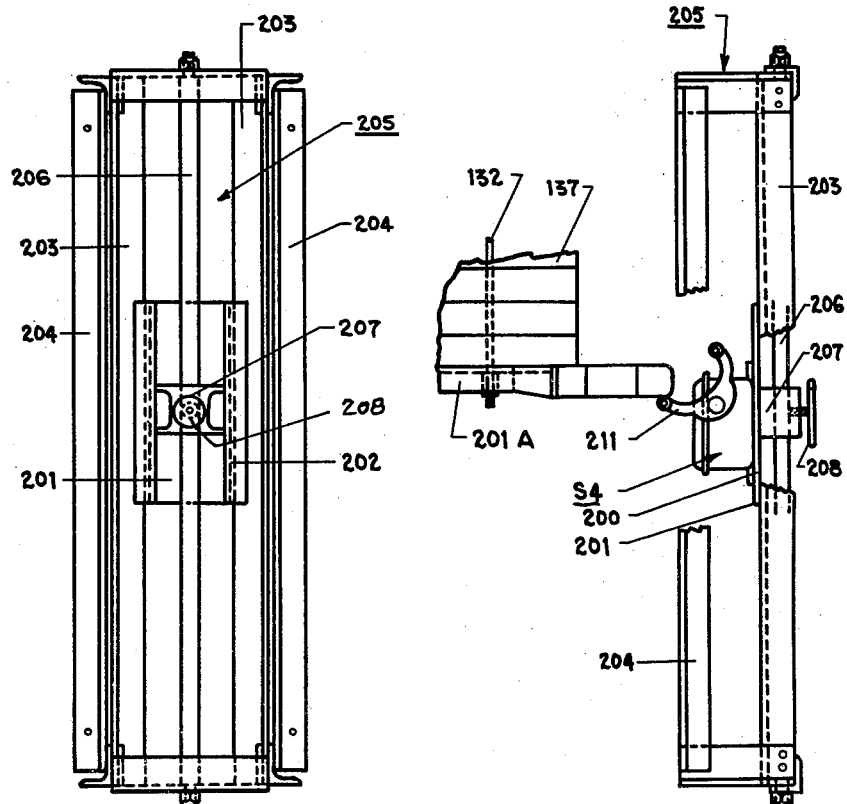

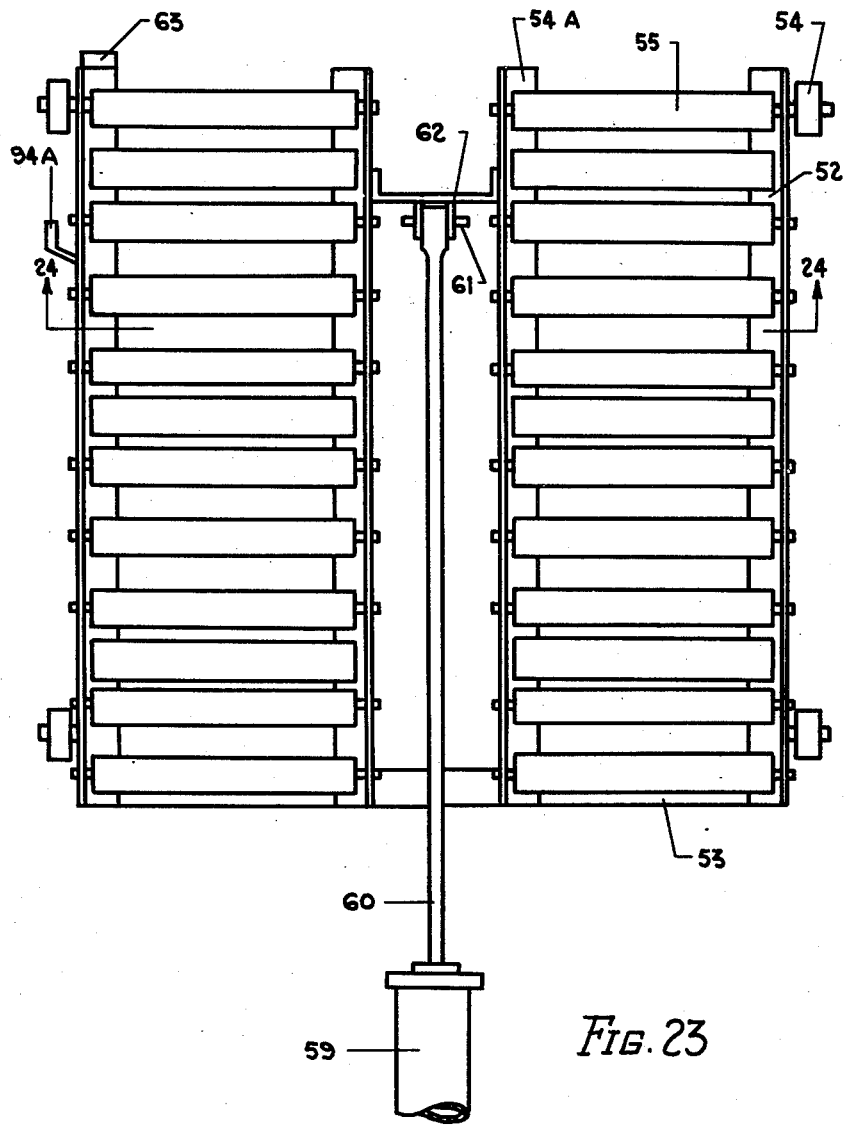

May 3, 1955  W. BISSET ET AL  2,707,567
STACKER AND LOWERER DEVICE
Filed Dec. 15, 1948  16 Sheets-Sheet 16
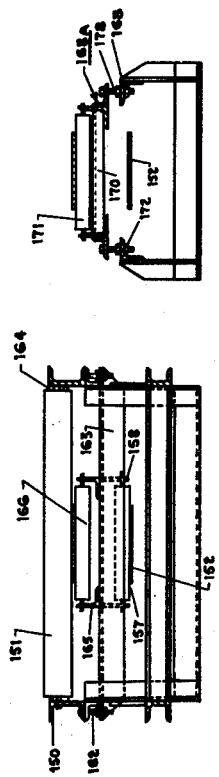
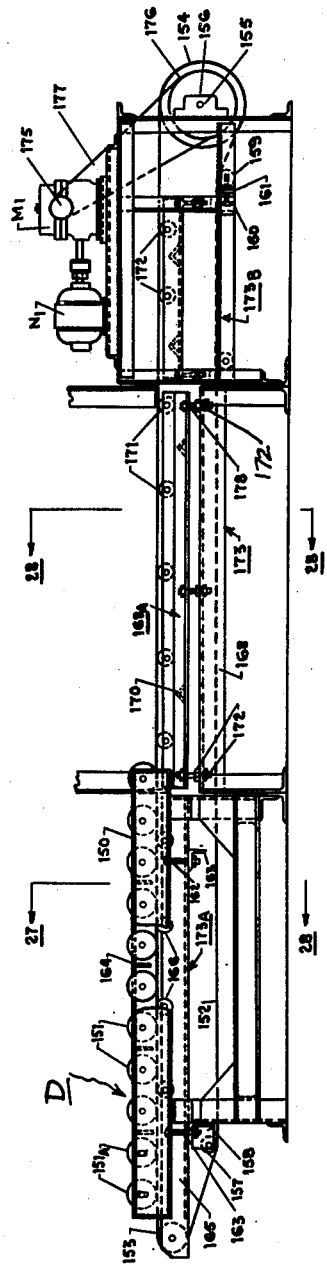
INVENTORS
WILLIAM BISSET
WILFRED STANLEY FROST
BY
ATTORNEY

United States Patent Office 2,707,567
Patented May 3, 1955

2,707,567

STACKER AND LOWERER DEVICE

William Bisset and Wilfred Stanley Frost, Port Hope, Ontario, Canada, assignors to Mathews Conveyer Company, Limited, Port Hope, Ontario, Canada Application December 15, 1948, Serial No. 65,306

Claims priority, application Canada December 17, 1947

22 Claims. (Cl. 214—6)

This invention relates to a stacker and lowerer.

The objects of the invention, generally, are to provide a very efficient stacker and lowerer.

A specific object of the invention is to provide an all-automatic stacker and lowerer operating to stack a desired number of loads upon the floor of a vertical conveyor, to lower the floor, and to move the stack off the floor onto a discharge conveyor, following which the floor moves back to its initial position to receive a second stack of loads.

Another specific object is to provide a stacker and lowerer in which the bundles move in series upon a conveyor for loading one by one onto a carriage, from which the bundle is dropped onto a vertical conveyor floor, the floor lowering at intervals so that the bundles are stacked upon the floor, the floor then lowering without stopping until it reaches a lowered position at which the floor comes to a stop and the stack is moved off the floor onto a discharge conveyor.

Another specific object is to provide a receiving conveyor for loading bundles one by one onto a vertical conveyor floor to form a stack, and associating with the conveyor a combined bundle-stopping and brake device so that a subsequent bundle is stopped upon the conveyor a distance away from a preceding bundle which is stopped adjacent the conveyor floor for loading onto the floor.

Another specific object is to actuate the several operative mechanisms of the stacker and lowerer by air and electric motors, respectively, and providing such controls—switches and valves—that the device is fully automatic and will not foul.

Another specific object is to provide a vertical conveyor floor including idler rollers upon which the stack of bundles rests, the idler rollers becoming live rollers when the floor has reached its fully lowered position so that the rollers operate to move the stack onto the discharge conveyor.

Another specific object is to so correlate the several controls that the carriage receives a bundle as soon as the carriage is in operative position overlying the vertical conveyor floor and a succeeding bundle is in position to be received by the carriage when the carriage is again in operative position following its return stroke to inoperative position to drop the bundle onto the floor, thereby reducing idle-machine time to a minimum.

Another specific object is to provide means of adjustably supporting a number of the controls—two switches—longitudinally of the vertical conveyor shaft structure to take care of bundles of ununiform height, or to vary the number of bundles intended to form a stack.

In the drawings, wherein like numerals of reference indicate corresponding parts in the various figures, and wherein is shown the preferred form of the invention, Figures 1 and 1A form together a more or less diagrammatic side elevation of a stacker and lowerer device made according to the present invention, part of the vertical conveyor shaft structure being broken away;

Figure 10 is a fragmentary end view on about line 10—10 in Figure 1, on an enlarged scale, parts being omitted, showing the gate;

Figure 11 is a section on about line 11—11 in Figure 10;

Figure 16 is a side elevation of Figure 15, parts being broken away;

Figure 17 is a section on line 17—17 in Figure 16;

Figure 18 is a diagrammatic view of the air system, as seen in plan;

Figure 19 is a fragmentary view of Figure 18, but as seen in side elevation;

Figure 20 is a horizontal section on line 20—20 in Figure 1;

Figure 21 is a fragmentary elevation of Figure 20;

Figure 22 is an elevation of Figure 21, as seen from right to left in Figure 21, parts being omitted;

Figure 23 is a plan view of the air-operated reciprocable carriage;

Figure 26 is a side elevation of the lower or discharge conveyor;

Figure 27 is a section on line 27—27 in Figure 26; and,

Figure 28 is a section on line 28—28 in Figure 27.

Figure 1:
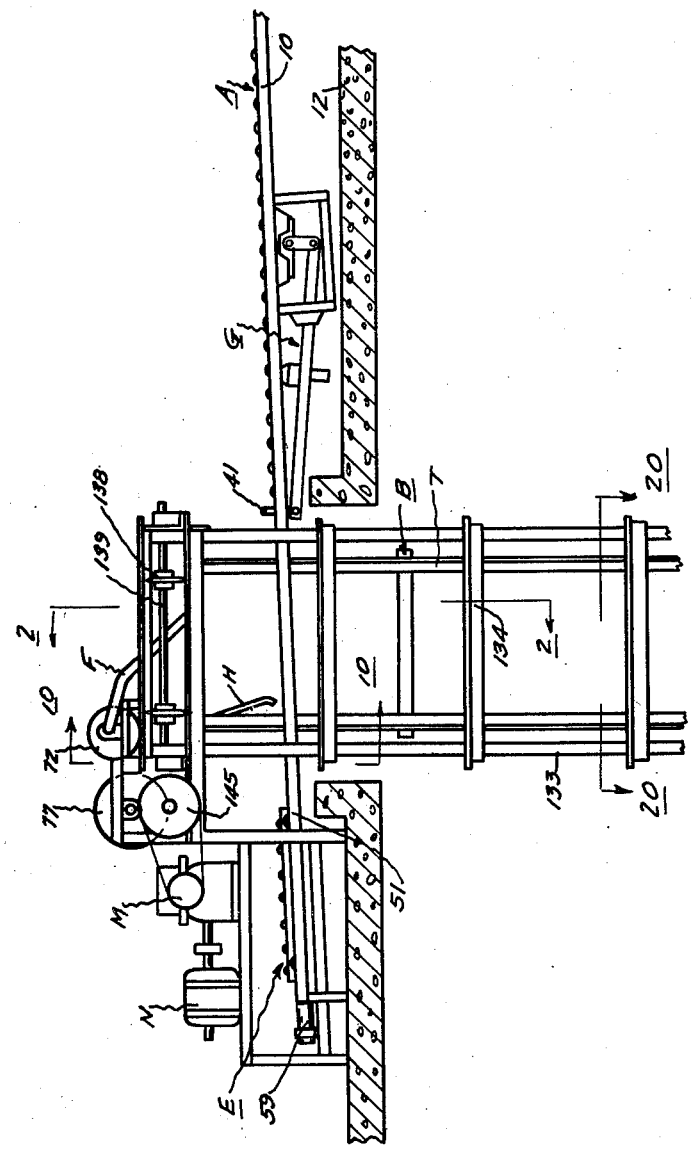
Figure 2:
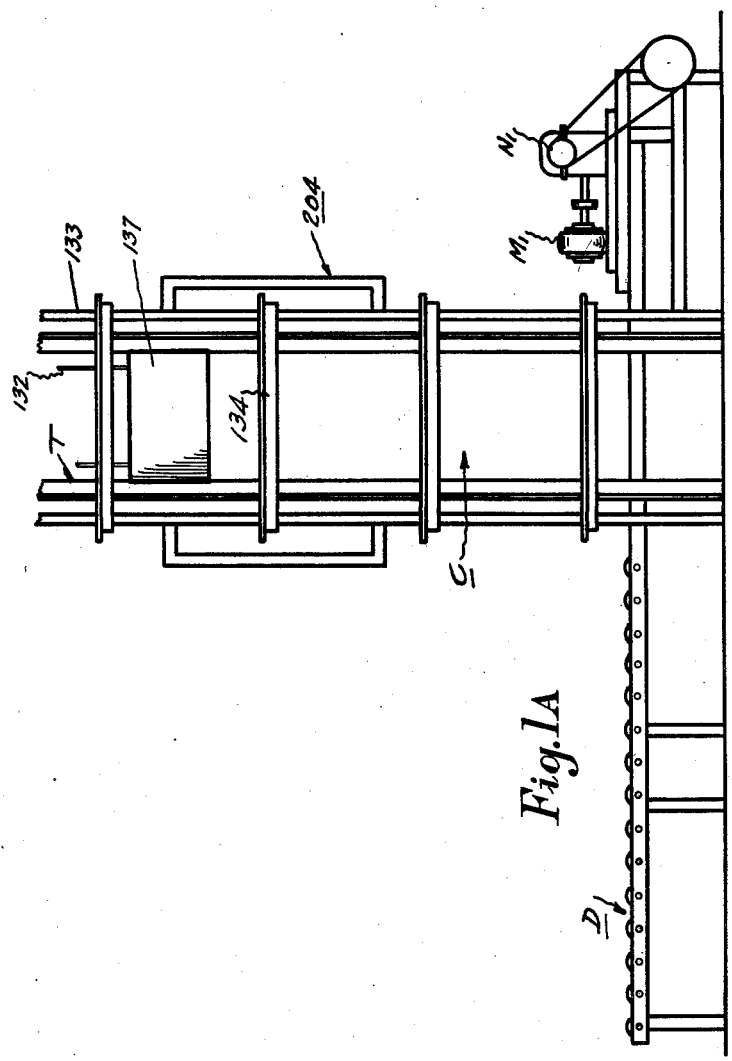
Figure 2 is a section on about line 2—2 in Figures 1 and 1A.
Figure 3:
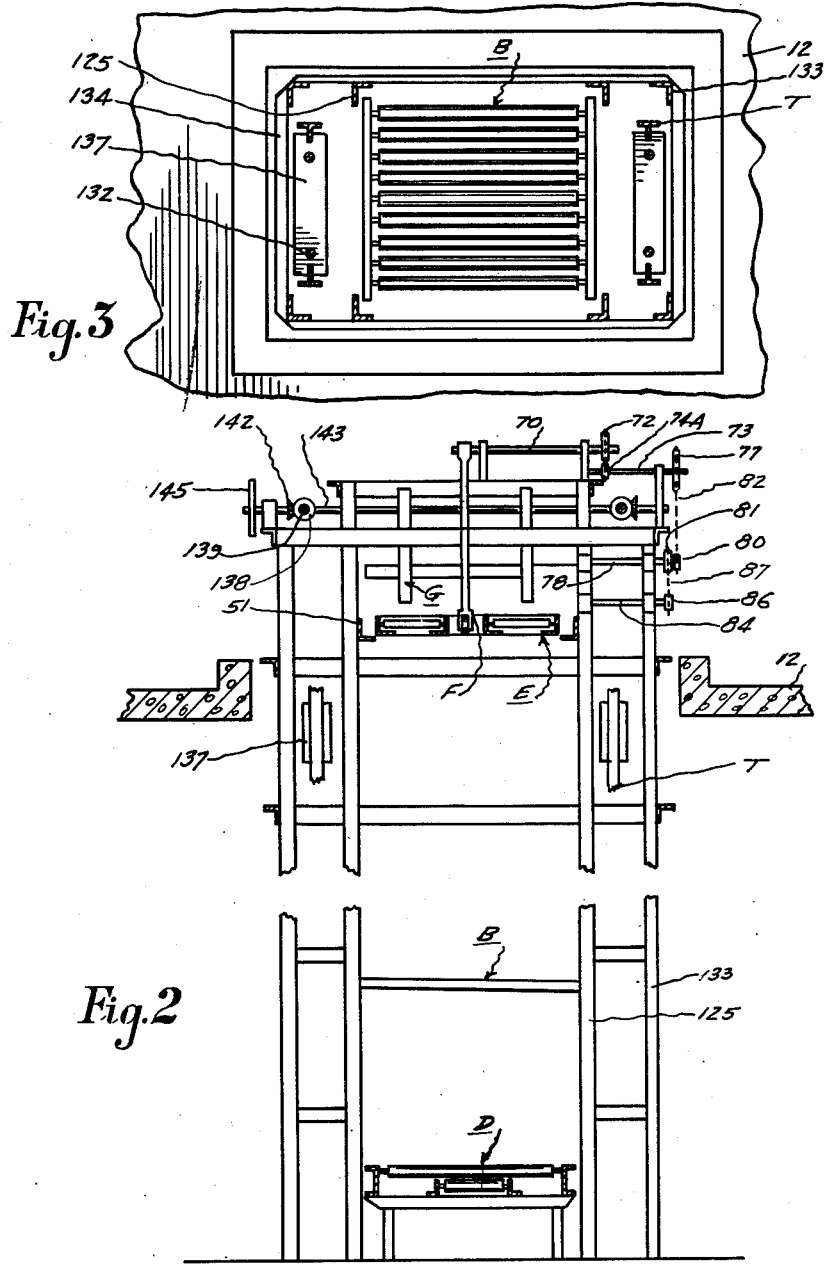
Figure 3 is a section on abount line 3—3 in Figure 1.

The main elements, that is, the elements which support the load from time to time, will first be referred to by reference to Figures 1 and 1A.

A is a conveyor, preferably a live roller conveyor, and preferably slightly inclined with respect to the horizontal. For convenience, this conveyor may be termed the receiving conveyor.

B is a vertical conveyor carriage or floor which is adapted to be lowered and raised in a suitable vertical conveyor shaft structure C. For convenience, the carriage may be termed the vertical conveyor floor.

E is a reciprocable carriage adapted to be moved toward and away from the receiving conveyor A, moving to a position overlying the floor B to receive the load from the receiving conveyor A, and moving away from the floor or structure C to allow the load (a bundle) to drop onto the floor B.

D is a second conveyor, which for convenience may be termed the discharge conveyor. The floor B serves to receive the load—bundles in the present instance—from the receiving conveyor A and to lower the load for delivery to the discharge conveyor D which is on a level lower than that of the receiving conveyor A.

When the device is idle, that is, before the first bundle of a series of bundles is deposited upon the conveyor A, the carriage E is in fully retracted or inoperative position, away from or clear of the floor B. The floor is now in fully raised position, ready to receive the first bundle.

When the first bundle is deposited upon the conveyor A, it moves to the end of the conveyor, where it comes to a stop adjacent the vertical conveyor structure C. As it so comes to a stop (stopped by a device to be referred to presently), the carriage E is moved toward the floor B, coming to a stop above the floor B. The movement of the carriage E forwardly toward the floor B causes an arm F to rotate through an arc of approximately 90° from a substantially vertical position, the arm coming to a stop in a substantially horizontal position above the carriage E (and above the carriage B). As the carriage E comes to a stop above the carriage B, a combined brake and bundle stop G comes into play. It is this device which caused the first bundle to come to a stop adjacent the vertical conveyor structure C. When the device so comes into play, it allows the first load to proceed toward and onto the carriage E, the bundle being impelled by the live rollers of the conveyor A. At the same time as the bundle is freed, a number of rollers of the conveyor A, which are idlers, are restrained from rotating, that is, braked, so that the second bundle on the conveyor A comes to a stop a distance away from the vertical conveyor—in practice, a distance at least equal to the length of the bundle. As the first bundle moves on the carriage E, it engages a pivoted gate H and moves the same to a substantially vertical position adjacent one side of the carriage B, the gate becoming locked in such vertical position. As the gate so becomes locked, the carriage E moves back or rearwardly to its initial or inoperative position, away from and clear of the floor B, the bundle dropping onto the floor B. As the carriage E so moves rearwardly, it unlocks the gate, but the gate remains in a vertical position because of its engagement with the bundle upon the floor B. The arm F, which was allowed to lower as the carriage E moved toward its retracted or inoperative position, now rests upon the top of the bundle. The rearward movement of the carriage E again brings the device G into play, releasing the idlers of the conveyor A and permitting the second bundle to proceed toward the floor B but causing the bundle to be stopped adjacent the vertical conveyor structure C. When the carriage E reaches its initial or retracted position, it operates a switch, closing a circuit to a motor N to actuate the floor B. The floor lowers the bundle, the arm F lowering with the bundle. When the floor B has lowered a distance about equal to the height of the bundle, the arm F engages and opens a second switch, cutting off the power to the motor N but operating a solenoid-operated brake associated with the motor to bring the floor B to a stop. After the bundle has lowered with the floor B and clears the gate H, the gate moves or swings slightly under the action of a counterweight, following which the carriage E moves toward the floor B preparatory to receiving the second bundle after the same is released or freed by the operation of the device G, thus initiating the second cycle of the operation by which the second bundle will be dropped onto the first bundle resting upon the floor B.

When the last of the desired number of bundles to be stacked upon the floor B drops upon the bundle just previously dropped from the carriage E, the floor B lowers without stopping until it reaches a position flush with the conveyor D when the stack of bundles will now be moved off the floor B onto the conveyor D. After the stack has been moved off the floor B, the floor will rise until it comes to a stop, at its initial position, ready to receive the first bundle of a second stack of bundles.

For convenience, in better describing the complete machine, several of its mechanisms will be referred to separately.

Figure 15:
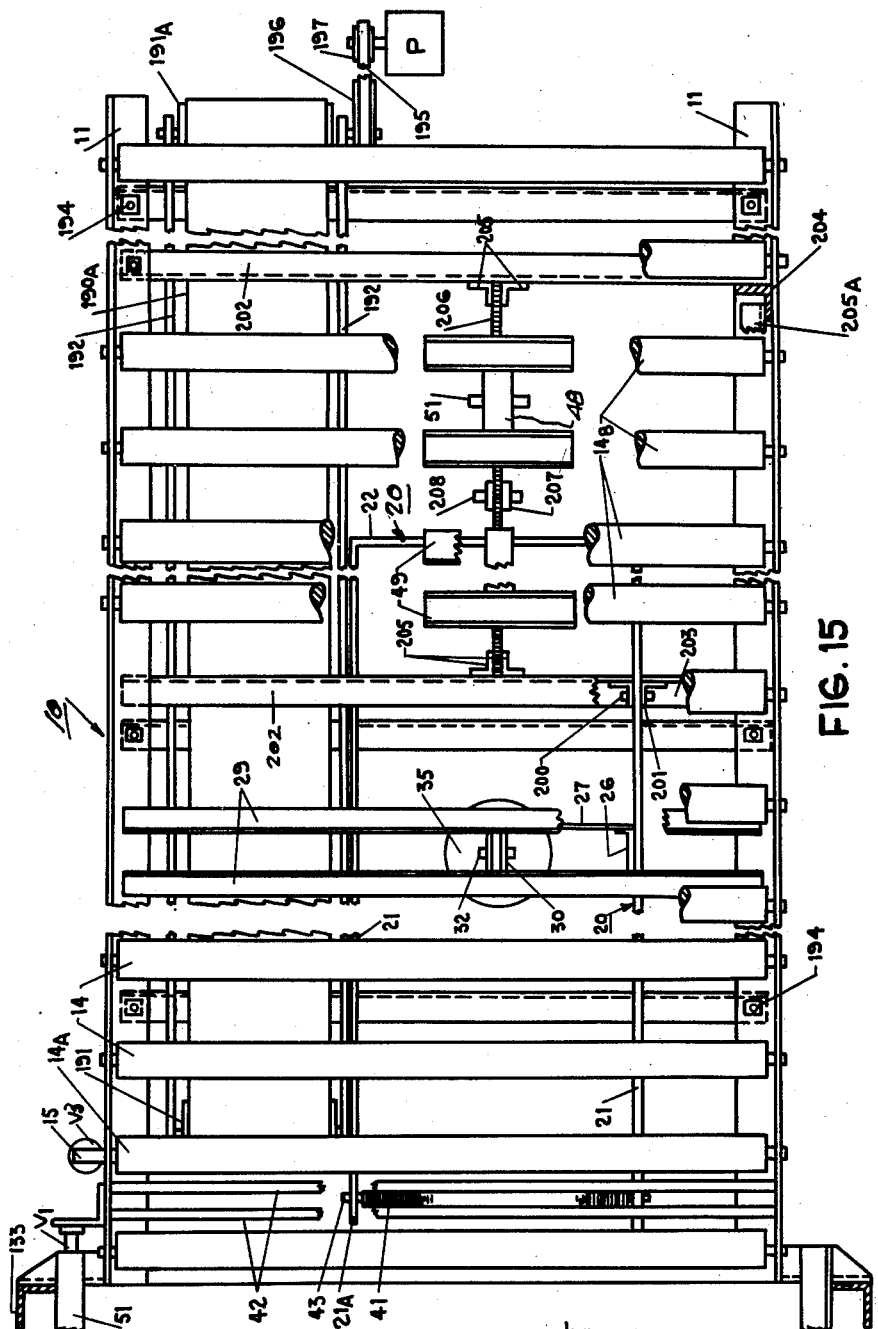
Figure 15 is a fragmentary plan view of the receiving conveyor.

LIVE ROLLER CONVEYOR A (See particularly Figures 15, 16 and 17)

Figure 8:
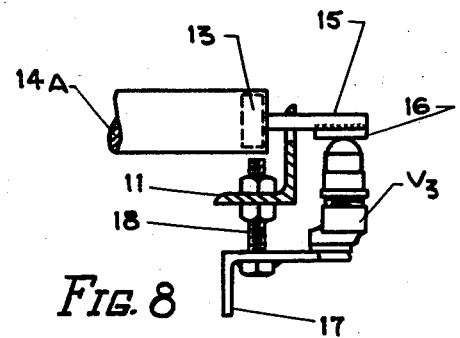
Figure 8 is a section on line 8—8 in Figure 7, parts being omitted.
Figure 9:
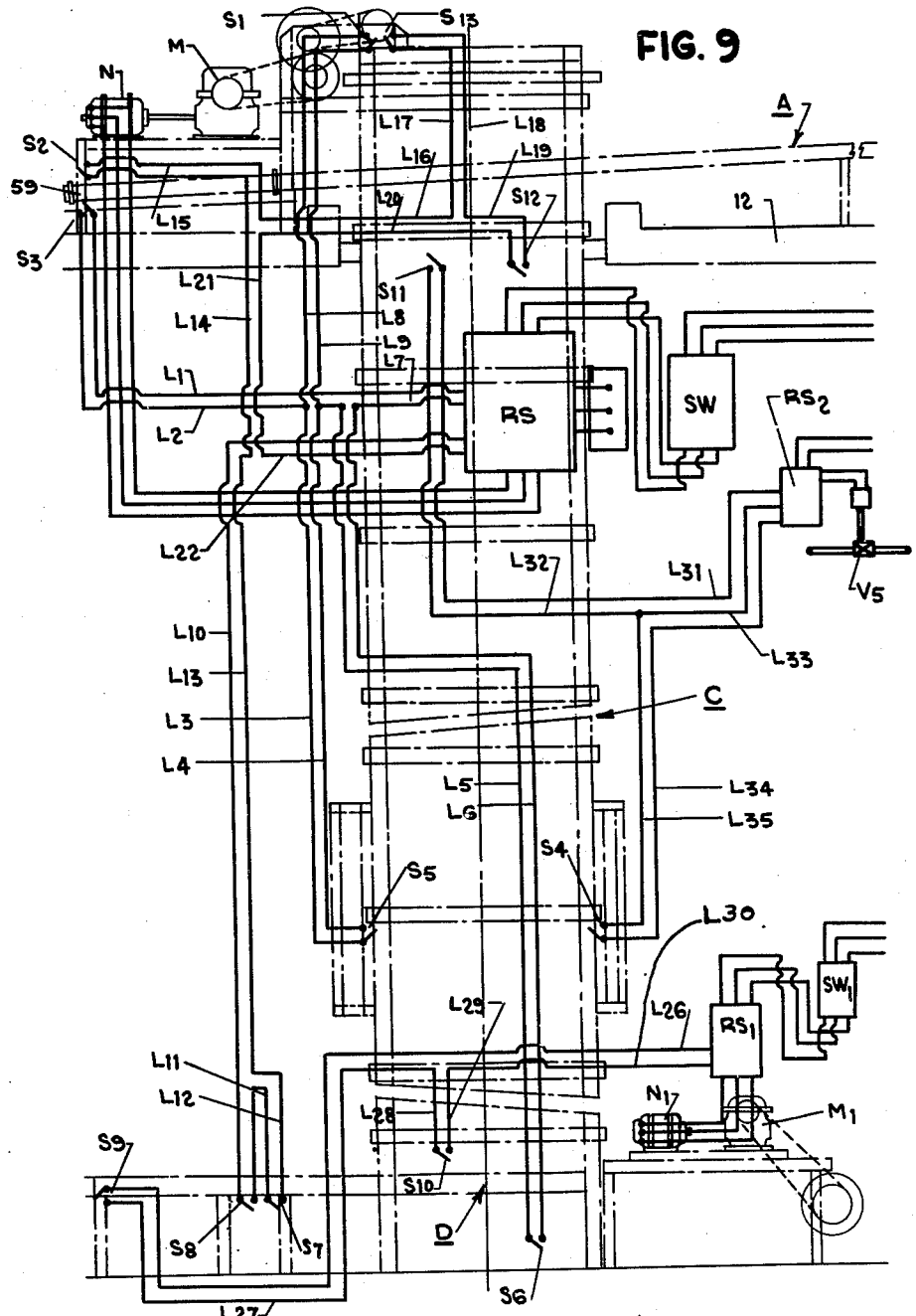
Figure 9 shows the wiring diagram.

A frame 10 including side angle bars 11, supported above the floor 12 as by suitable uprights, journals a plurality of rollers 14. One of the rollers, 14A, positioned close to the vertical conveyor structure C, is a floating roller. As seen in Figure 8, the ends of the roller are recessed inwardly to form circular chambers rotatably receiving cylindrical bearings 13 from which rigidly extend rods or axles 15, preferably of hexagonal cross-section, all according to well known practice. One such axle has welded thereto a plate 16 adapted to bear upon the operative end of an air bleeder valve V3. When the roller is loaded, it operates the valve, for a purpose to be explained later. The valve V3 is secured to a bracket 17 adjustably supported under the angle 11 as by bolts 18.

The live rollers 14 are rotated in any approved manner. For instance, an endless belt 190A is trained around a roller 191 and a pulley 191A journalled in members 192 suspended under the frame 10 as by transverse angle members 193 supported by bolts 194 hung from the side angles 11 of the frame 10. The pulley 191A is driven from a source of power P as by a roller chain 195 tensioned between a sprocket 196 turning with the pulley and a sprocket 197 turned by the power plant P. Idlers and suitable belt tightening means (not shown) may be provided according to the usual practice.

COMBINED BRAKE AND BUNDLE STOPPING DEVICE G (See particularly Figures 15 and 16)

20 is a rectangular frame which may include longitudinal side members 21, a rear transverse member 22 and a front transverse member 23. The rear member 22 carries a centrally located perforated lug 24. The side members 21 project beyond the front member 23 as at 21A and are formed with inwardly-directed recesses 25. Depending from the side members 21 are channels 26 to which are secured the opposite ends of two spaced bars 27. Secured between the bars 27, midway of their length, are two perforated plates 28 (see Figures 15 and 16). Supported by the side angle bars 11 of the frame 10 of the live roller conveyor A are transverse angle members 29 between which are secured two plates 30 (see Figure 16). Pivotally connected as at 31 to the perforated plates 28 is one end of the piston rod 34 of a pneumatic device or cylinder 35 pivotally suspended as at 32 from the plates 30.

The frame 20 is operatively supported rearwardly of the cylinder 35, as at 200 from the frame 10 of the conveyor A, more particularly, from a frame structure rigid with the frame 10. Thus, transverse angles 202 are secured to the side members 11. Depending from the angles 202 are upright angles 204. Secured to the upright angles 204 are transverse angles 203. Secured to the forward angles 202 and 203 are upright angles 201 forming supports for the pins 200 on which the side members 21 of the frame 20 are pivotally supported. Secured to the angles 202 and 203 are upright angles 205 spaced apart to form guides between which the opposite ends of a bar 206 are movable. The bar 206 is supported at mid-length by the rear end of the frame 20, more particularly by a pair of bars or links 207 pivotally connected between the bar 206, as at 208, and the rear lug 24 of the frame 20, as at 209.

As the frame 20 is operatively pivoted to the frame 10 as by the pins 200, the front end of the frame can be raised or lowered, and the rear end of the frame can also be lowered or raised by the pneumatic device or cylinder 35.

41 is a plate which is adapted to be raised and lowered between two spaced guide bars 42 extending transversely between the side members 11 of the frame 10 of the receiving conveyor A. This plate, when raised to project above the effective plane of the rollers 14, forms a stop for the bundle moving on the conveyor A. The plate or stop 41 extends between the side members 21 of the frame 20 and carries at opposite ends, pivots 43 which are received in and are supported in the recesses 25.

Pivotally supported as at 51 by the bar 206 are a number of U-shaped members 48 to which are rigidly secured a number of brake shoes 49 formed to engage and disengage a number of idler rollers 14B of the conveyor A. The idlers may therefore be made to run free or be braked, being free when the rear end of the frame 20 is lowered and being braked when the rear end of the frame is raised. Thus, on one position of the frame 20, the idler rollers 14B are free and the stop 41 is effective to stop the bundle on the conveyor A; on the other hand, when the frame is in the other position, the idler rollers 14B are braked and the stop 41 is ineffective and the bundle is free to resume its travel forwardly.

CARRIAGE E

The carriage E moves on tracks 51 which extend forwardly to adjacent the delivery end of the conveyor A. The frame of the carriage may include side angle bars 52 and transverse bars 53. Journalled in the side angles 52 are wheels 54 which ride on the tracks 51. Secured between the transverse bars 53 are two spaced angle bars 54A. Freely journalled in the bars 54A and the side bars 52 are rollers 55. Anchored to a structure in part supporting the tracks 51 and supporting an electric motor N and speed-reducing device M, is a pneumatic device including a cylinder 59 which is adapted to be received into the space between the angle bars 54A when the carriage E is in its initial or inoperative position. The piston rod 60 of the cylinder 59 is connected, as by a pin 61, to a bracket 62 fixed to the carriage E, so that the carriage can be moved forwardly and rearwardly by the pneumatic device. The front end of the carriage includes a buffer member 63 positioned near one side thereof to be clear of the conveyor A. This buffer is adapted to engage and actuate an air bleeder valve V1 secured to the frame of the conveyor A.

CONTROL ARM F

As already explained, the arm F is swung upwardly by the movement of the carriage E when moving toward the conveyor A, but swings downwardly by its own weight when the carriage E moves back toward its initial or inoperative position.

Figure 4:
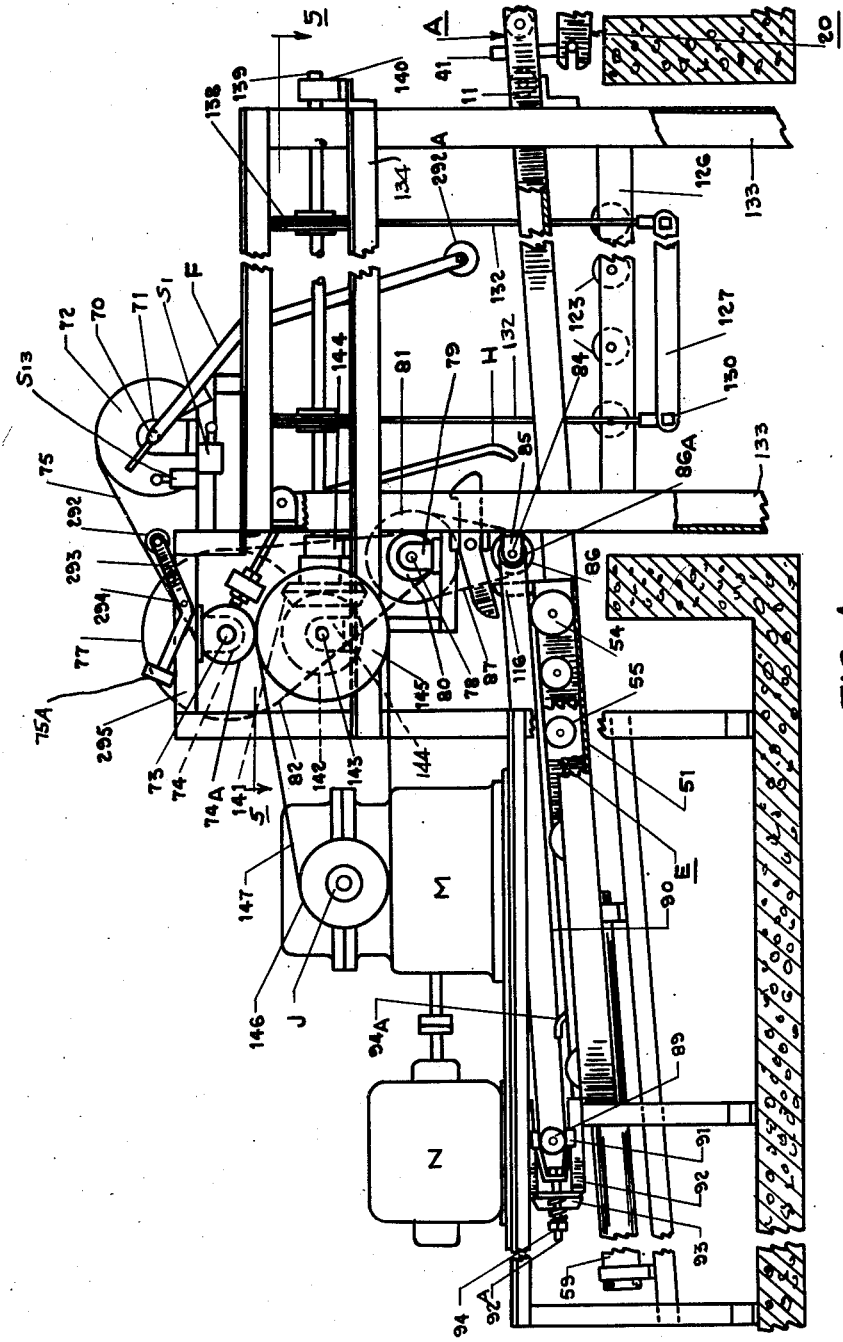
Figure 4 is a fragmentary view of Figure 1, on an enlarged scale.

One end—the inner end—of the arm E is secured to a transverse horizontal shaft 70 journalled in bearings 71, one of which is positioned at about the centre of the two sets of rollers 55 of the carriage E, so that the arm F will oscillate in a vertical plane lying between the two sets of rollers. The other bearing is positioned outwardly of the carriage. Secured to the shaft 70 is a sprocket 72. Secured to one end of a second transverse shaft 73 journalled in bearings 74, is a sprocket 74A. A chain 75 is anchored at its opposite ends to the sprocket 72 and the sprocket 74A, so that rotation of the second shaft 73 in an anti-clockwise direction, as seen in Figure 4, will rotate the shaft 70 in the same direction and thus swing the control arm F toward horizontal position. On the other hand, when the shaft 73 rotates in a clockwise direction, also as seen in Figure 4, such rotation will be ineffective to urge the arm F to lower. Secured to the other end of the second shaft 73 is a sprocket 77. 78 is a third transverse shaft journalled in bearings 79, the shaft having secured thereto sprockets 80 and 81, respectively. Trained between the sprockets 77 and 80 is a roller chain 82. 84 is a fourth transverse shaft journalled in bearings 85, to the opposite ends of which are secured sprockets 86 and 86A. Trained between the sprockets 86 and 81 is a chain 87. Trained between the sprocket 86A and a sprocket 89 is a chain 90. The sprocket 89 is journalled in a shoe 91 mounted for sliding movement in a bracket 92 secured to the structure supporting the tracks 51. Suitable means may be provided for tensioning the chain 90. For instance, from the shoe 91 extends a threaded rod 92A passing through an angle 93 forming part of the bracket 92, to receive a nut 94. The carriage E is operatively secured, adjacent its rear end, to one side—the lower side—of the chain 90, so that the movement of the carriage will also move the chain therewith. Thus, a bracket 94A, secured to the carriage, is adapted to be clamped to the chain. The arrangement of sprockets and chains just described, the number of which may vary, serves as a means for translating a longitudinal movement of the carriage E to a rotary movement of the arm F on the axis of its supporting shaft 70 and serves also to limit the movement of the arm through an arc of about 90° notwithstanding the substantial lineal displacement of the carriage E.

Preferably, a device for tensioning the chain 75 is used. It may include a sprocket 292 journalled on the end of a lever 293 pivoted at its other end, as at 294, to a member 295, the sprocket 292 riding under the chain 75 and being held thereagainst by a counterweight 75A.

GATE H

The gate H is located on one side of the vertical conveyor shaft structure C, that is, on the side which is remote from the lower or discharge end of the conveyor A. The gate serves to provide a stop determining the movement of the bundle which has been moved onto the carriage E by the conveyor A. The gate, which is normally unlocked, is locked in a vertical position by the momentum or pressure of the bundle when it has been fully loaded upon the carriage E. The gate also serves to actuate or control two air bleed valves V2 and V4 for a purpose to be described later (see "Air system").

The gate may include two bars 100, preferably slightly curved at the bottom as at 101, secured to a shaft 102 journalled in bearings 103, and a transverse T iron 104 which extends at one end beyond one of the bars 100. Secured to the shaft 102 is a rod 105 threaded to receive nuts 106 by which a counterweight 107 is adjustably secured lengthwise of the rod. The counterweight tends to swing the gate off the vertical and toward the conveyor A, such swinging movement being determined by the engagement of the upper end of one of the bars 100 with a screw 108 adjustably carried in a member 109 of the structure.

The gate is locked in its vertical position by a latch 110 formed to engage the lower edge of the T bar 104 where it extends beyond the adjacent bar 100, and releasably lock the gate in the position shown in Figure 11. The latch is pivotally mounted as at 111 intermediate of its length and its forward or operative end is urged upwardly by a coil spring 112 tensioned between the latch, forwardly of its pivot 111, and a pin 113 secured to the structure, the upward movement of the latch being determined by a stop 114. The latch, rearwardly of its pivot 111, is directed slightly downwardly and its lower edge is adapted to be slidably engaged by a member 116 of the frame of the conveyor E, more particularly rising from one of its side angle bars 52, to actuate the latch to release or unlock the gate, just as the carriage E, on its return stroke, about reaches its fully returned or initial position. When the gate is closed by a bundle, the carriage E is by that time above the floor B so that the latch control member 116 does not prevent the locking operation of the latch. Secured to the shaft 102 are two levers 118 which serve to engage and control the two air bleed valves V2 and V4 for a purpose to be explained later.

Figure 12:
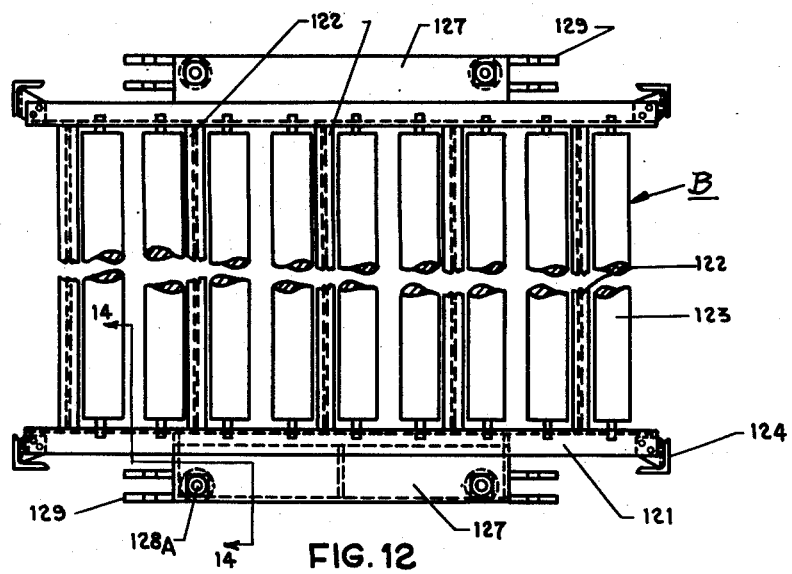
Figure 12 is a fragmentary plan view of the vertical conveyor floor.
Figure 13:
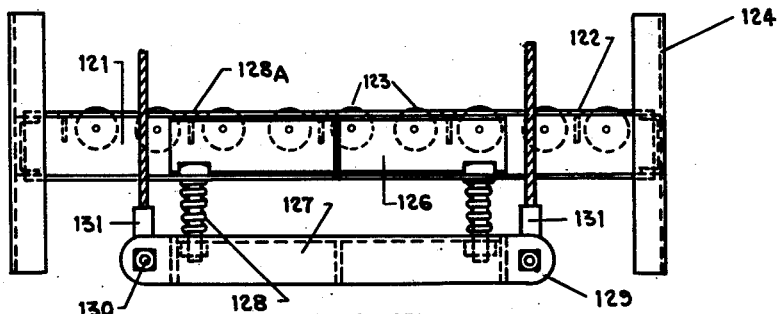
Figure 13 is a side elevation of Figure 12.
Figure 14:
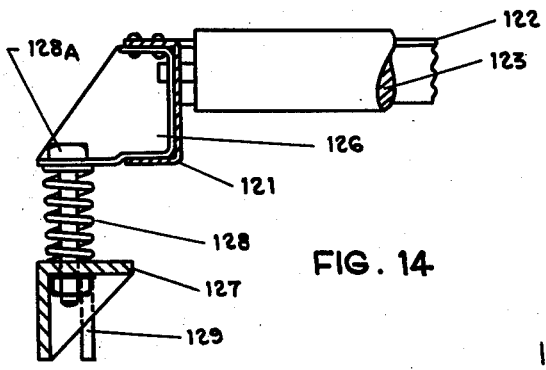
Figure 14 is a section on about line 14—14 in Figure 12, parts being omitted.

VERTICAL CONVEYOR FLOOR B (See particularly Figures 12 to 14)

The floor B includes a frame comprising two side channels 121 between which are rigidly secured transverse T members 122. Freely journalled to turn in the side channels 121 are rollers 123. Secured to each corner of the frame, more particularly to the ends of the channels 121, is an upright angle 124, the angles 124 serving as shoes adapted to slide on or move between vertical angle guide members 125 forming part of the vertical conveyor shaft structure C. Rigidly secured to the channels 121 are brackets 126, the brackets extending laterally beyond the channels. 127 are angle shaped members forming supports for coil springs 128 which, in turn form supports for the floor B. Bolts 128A through the coil springs 128 and the member 127, and the brackets 126, serve to hold the floor B assembled to the members 127. The ends of the members 127 are provided with two parallel lugs or ears 129 having registering holes. Pivoted to and between the ears 129, at each end of the member 127, as by a bolt 130 passed through the holes, is the last link of a conventional steel chain 131.

VERTICAL CONVEYOR SHAFT STRUCTURE C

Figure 5:
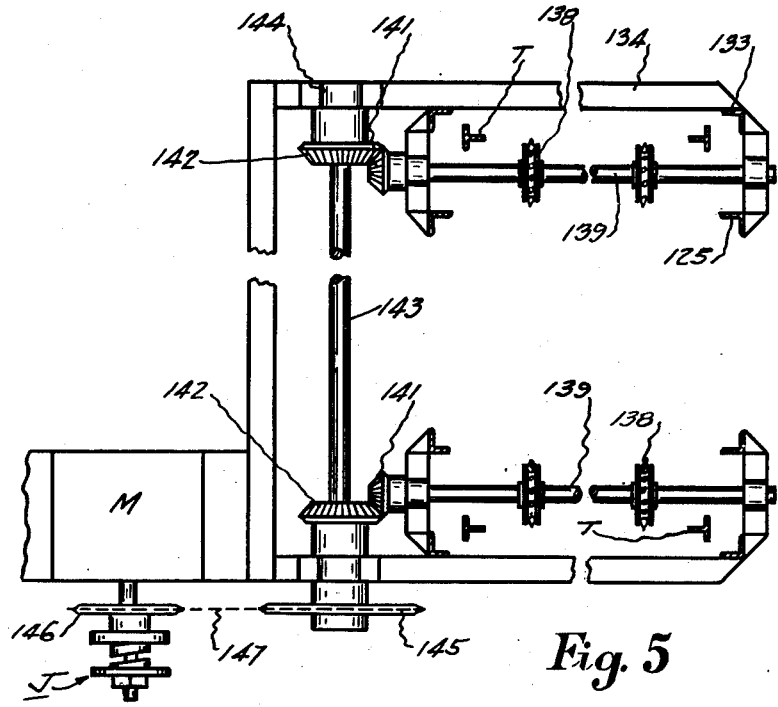
Figure 5 is a section on about line 5—5 in Figure 4, parts being omitted for the sake of clarity, showing the vertical conveyor floor rising and lowering mechanism.
Figure 24:
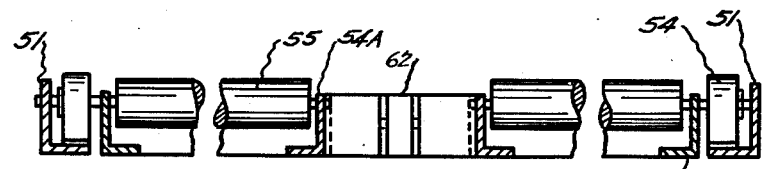
Figure 24 is a section on line 24—24 in Figure 23, on an enlarged scale.
Figure 25:
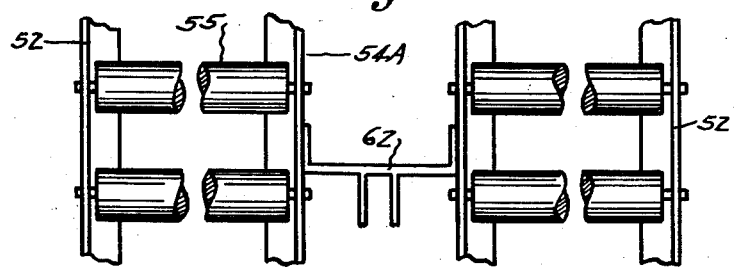
Figure 25 is a fragmentary plan view of Figure 23.
Figure 6:
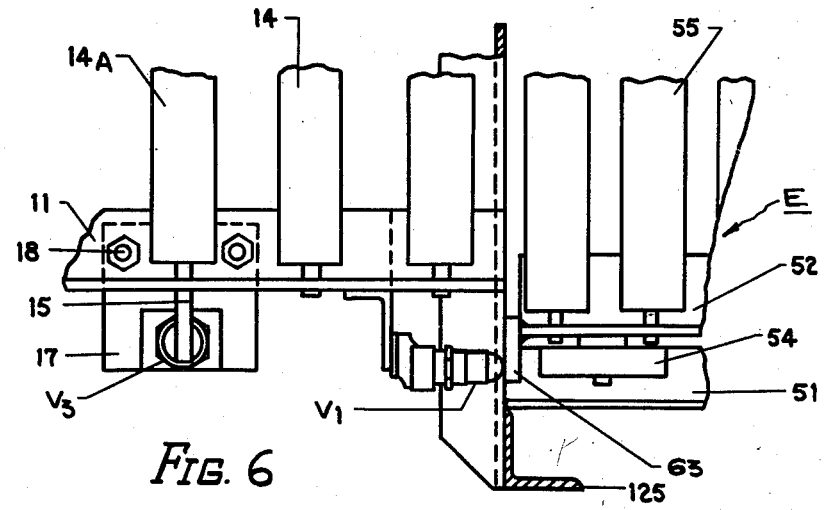
Figure 6 is a fragmentary plan view showing part of the receiver conveyor and the vertical conveyor floor.
Figure 7:
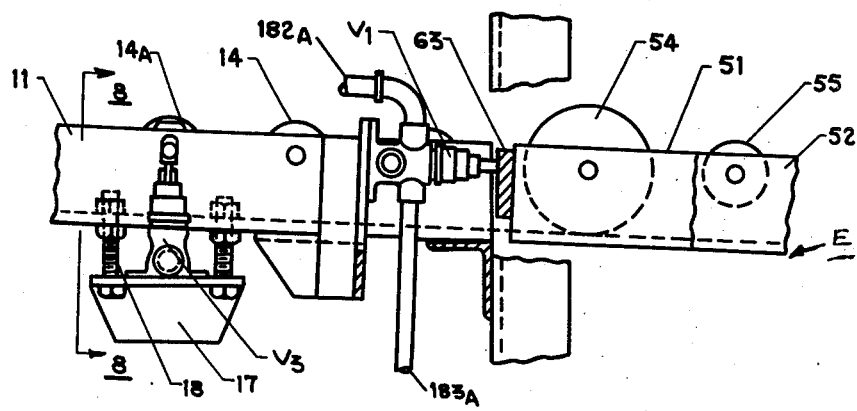
Figure 7 is an elevation of Figure 6, parts being broken away.

The shaft structure includes corner vertical angle members 133 and spaced horizontal angle members 134 and 135 rigidly secured to the vertical members to provide a rigid structure. To the members 135 are secured the tracks or guides 125 aforesaid. Suitably secured to the shaft structure are vertical T beams T which serve as guides for the counterweights 137 of the floor B which is supported by the chains 132 aforesaid. The chains are supported by sprocket wheels 138 fixed to horizontal drive shafts 139 journalled in bearings 140 supported by the shaft structure. To one end of each of the drive shafts 139 is fixed a bevel gear 141, the gears 141 meshing with bevel gears 142 fixed on the ends of a shaft 143 journalled in bearings 144 supported by the shaft structure. Also fixed to one end of the shaft 143 is a sprocket wheel 145. Trained between the wheel 145 and the sprocket 146 of the output shaft of the speed-reducing device M, is a chain 147. Preferably, the sprocket 146 is operatively connected to the driving shaft of the speed-reducing device M as by a friction clutch J which may be conventional (see Figure 5).

DISCHARGE CONVEYOR D

The conveyor comprises two main sections, one, 173, lying below the floor B (and within the shaft structure) and the other, 173A, lying to one side of the shaft structure. The section 173A includes longitudinal side channels 150 supported by a suitable structure, in which channels are freely journalled rollers 151, two of which, 151A, are floating rollers, for a purpose to be explained later. The rollers are rotated by an endless belt 152. T beams 164 secured between the channels serve to hold the same in spaced relationship. The belt is trained between a roller 153, and a pulley 154 fixed to a shaft 155 journalled in bearings 156. The lower run of the belt engages a roller 157 journalled in bearings 158, and a roller 159. Means for moving the roller 159 bodily lengthwise of the conveyor may be provided for purposes of tensioning the belt 152, such as screws 160 adjustably threaded through brackets 161 and engaging the shaft supporting the roller 159.

Adjustably suspended from the side channels 150 as by bolts 162, are transverse angle bar members 163 to which are secured longitudinal angle bars 165. Journalled in the bars 165 are rollers 166 adapted to engage the upper run of the belt 152 to hold the same in effective engagement with the rollers 151 and actuate the same. The other main section 173, of the conveyor includes side longitudinal angle bar members 168 supported by a suitable structure. Adjustably carried above the side angle members 168 is a frame which includes side members 168A and transverse spacers 170. Freely journalled in the side members 168A are rollers 171 adapted to form a support for the upper run of the belt 152. To adjustably support the frame journalling the rollers 171, bolts 178 may be welded at one end to the side members 168A and passed through the side members 168 to which they are releasably and adjustably locked, as by nuts 172. The conveyor also includes a short frame section 173B, similar in structure and function to that of the section 173, which supports rollers 172 adapted to engage the upper run of the belt 152.

On the structure supporting this section of the conveyor is mounted a suitable electric motor N1 driving a speed-reducing device M1. Trained between the driving sprocket 175 of the device M1 and a sprocket 176 fixed to the shaft 155 is a chain 177.

ADJUSTABLE LIMIT SWITCHES

As previously explained, the carriage B lowers a distance equal to the depth or height of a bundle and stops, and lowers again a similar distance, and so on until the required number of bundles are stacked, after which the floor lowers uninterruptedly until it reaches the bottom of the vertical conveyor shaft, when the stack is moved onto the discharge conveyor D. The uninterrupted downward travel of the carriage B as aforesaid is rendered possible by the effective engagement of one of the counterweights 137 with a limit switch S4. Reference will again be made to this switch under the heading of "Wiring diagram." However, as the depth of each of the bundles to be stacked may not always be the same, according to the stacking and lowering job on hand it is necessary that the position of the switch S4, lengthwise of the shaft, be changed. Accordingly, means are provided for changing the position of the switch, as seen in Figures 20 to 22. The limit switch is a conventional switch, known as Clark type T. L. F. toggle limit switch, which includes a base 200. The base is suitably secured to a plate 201 formed with side grooves 202 adapted to slide on angle members 203. The members 203 form part of a rigid frame 205 which includes angle members 204 secured to the shaft structure, more particularly, being conveniently secured to the angle members 125 and 133 of the shaft structure. Secured lengthwise of the frame 205 is a rod 206 which slidably receives a lug or boss 207 forming a part of the plate 201. A screw 208 threaded through the boss 207 to engage the guide rod 206 serves to adjustably and releasably lock the switch S4 in selected position lengthwise of the frame 205 and, therefore, of the vertical conveyor shaft. Another conventional limit switch S5, such as Model C10316, type F, Cutler-Hammer limit switch, is also adjustably mounted longitudinally of the shaft, by means 210 similar in structure and function as that mounting the switch S4. To actuate the switches S4 and S5, an actuator member 201A may be secured to the lower end of the counterweight, the ends of the actuator engaging the switch arms 211 and 212 of the switches S4 and S5, respectively, to open and close the switches, as the case may be.

AIR SYSTEM 180 is a master control valve connected to a source of air (not shown) under pressure by means of a pipe 181. The valve is connected to opposite ends of the pneumatic device or cylinder 35 as by pipes 182 and 183. The valve used is a conventional valve, known as Logan Master Control Valve, Model No. 6245, manufactured by Logansport Machine, Inc., of Logansport, Indiana. The opposite ends of the valve are connected to the opposite ends of a conventional air bleeder valve V1, also manufactured by the same company and known as Model No. 6227, as by pipes 182A and 183A. When the air bleeder valve is in normal position or released, air from the pipe 183 is fed into the lower end of the cylinder 35 and the frame 20 of the combined brake and bundle stopping device G is in the position shown in Figure 16, the plate or bundle stop 41 now being raised and effective to provide a stop for the first bundle on the conveyor A. On the other hand, when the air bleeder valve V1 is operated, air will be cut into the upper part of the cylinder 35, moving or swinging the frame 20 on its pivotal axis or pin 32, and lowering the bundle stop 41 and braking the rollers 14B.

180A is a second master control valve, which is the same as valve 180 aforesaid. The valve 180A is con-connected to the source of air as by a pipe 181A and is connected to the opposite ends of the cylinder 59 as by pipes 184 and 184A. In the length of the pipe 181A is interposed a solenoid operated air valve V5. One end of the valve 180A is connected to an air bleeder valve V3 as by a pipe 185. The other end of the valve 180A is connected to an air bleeder valve V4, as by a pipe 186. Both the valves V3 and V4 are conventional valves, known as Logan air bleeder valves, Models 6257 and 6254, respectively. Speed control valves 180AA may be used in the length of the pipes 184 and 184A.

Interposed in the length of the pipe 185 is a valve V2, also a conventional air bleeder valve, Logan Model 6254. The valves V2 and V4 are operated by the gate H, as already stated, and they are so fixed or positioned that when the gate is released or partially open, the valve V2 is open, while the valve V4 is closed. On the other hand, when the gate is locked (in vertical position), valve V2 is closed while valve V4 is open. When valve V2 is open, air is cut into the rear of the cylinder 59 and the carriage E moves forwardly toward the vertical conveyor, coming to a stop above the carriage B. When the valve V2 is closed, by the gate, and valve V4 is open, by the gate, air is cut into the forward end of the cylinder 59, moving the carriage E rearwardly toward its normal or inoperative position away from the carriage B.

The air system, therefore, operates in the following manner. The first bundle reaching the floating roller 14A operates the bleeder valve V3, cutting air into the rear of the cylinder 59 to actuate the carriage E. When the carriage E has moved to a position above the carriage B, it engages the valve V1, which operates to cut air into the upper part of the cylinder 35, to move the frame 20 to lower the bundle stop and allow the bundle to move forwardly onto the carriage E. As the bundle reaches the gate H, the gate is moved to its vertical position, where it becomes locked, and the gate now operates the valves V2 and V4, closing V2 and opening V4. As the bundle leaves or clears the floating roller 14A, the frame 20 swings back to its initial position, allowing the second bundle to now move forwardly until it is stopped by the stop 41. The bundle now depresses the floating roller 14A and opens the valve V3, but the valve is now ineffective since the valve V2 is closed. The valve V4 now cuts air into the rear of the cylinder 59, causing the carriage E to move back to its initial position, unlocking the gate while so moving back. The gate is held in its vertical position by the bundle, the bundle, of course, dropping onto the carriage B. The carriage B now proceeds to lower, but while the bundle is in engagement with the gate, the gate remains in a vertical position, keeping valve V2 closed and valve V4 open as aforesaid. When the bundle clears the gate, V4 closes and V2 opens. As V2 opens, V3 becomes effective, and air is again cut into the rear of the cylinder 59, to move the carriage E forwardly and initiate a second cycle of operations.

WIRING DIAGRAM

The motor N is wired to the supply mains through a conventional reversing starter "A," Canadian Cutler-Hammer, size "0"—shown as RS—and through a disconnect switch SW. The starter is provided with manually-operated buttons to operate the motor to lower the vertical conveyor floor B, or to raise the floor, or to stop the motor, as desired.

The other motor N1 is wired to the supply mains through a conventional reversing starter "B," Canadian Cutler-Hammer No. 9586–H1687—shown as RS1—and a disconnect switch SW1.

Four distinct circuits are provided:

(1) Circuit operating the starter RS to actuate the motor N to lower the floor B, which may be termed the "lowering circuit";

(2) Circuit operating the starter RS to actuate the motor N to raise the floor, which may be termed the "raising circuit";

(3) Circuit operating the starter RS1 to actuate the motor N1 to actuate the discharge conveyor D, which may be termed the "discharge conveyor circuit"; and, (4) Circuit operating the solenoid-operated shut-off valve V5, which may be termed the "air shut-off valve circuit."

Lowering circuit (1)

Switch S3, which is normally open but is closed by the carriage E when in inoperative position, and switch S1, which is normally closed but is open when the arm F is in lowered position, are connected in series to the starter RS as by leads L1, L2, L8, L9, L5, L6 and L7. Also in series with switches S3 and S1, is a switch S6 disposed at the bottom of the shaft structure C, switch S6 being normally closed but being opened by the floor B upon reaching the bottom of the shaft, that is, when flush with the discharge conveyor D. Thus, when the carriage E is in inoperative position and no bundle is lying upon the floor B, the circuit to the motor N is closed up to switch S3, but the motor will not start as switch S1 in the same circuit is held open by the control arm F being in its lowered position. When there is a bundle upon the floor B, and the arm F is still in contact with the top of the bundle and the carriage E is in inoperative position (and until the arm has cleared the bundle and is in fully lowered position), the circuit is closed and the motor N turns, lowering the floor B.

In parallel with switches S1 and S3 is the switch S5, already referred to under the heading "Adjustable limit switches," being connected to the leads L2 and L5 as by leads L3 and L4. Switch S5 is opened and closed, alternately, by the floor B, more particularly, by one of the counterweights 137, being closed by the downward movement of the floor and being opened by the upward movement of the floor. When the floor has lowered the required distance, determined by the number of bundles stacked upon the floor, this switch is closed (switch S1 is now open) so that the circuit to the starter is now through L1, L2, L3, through the switch S5, leads L4, L5, switch S6, and leads L6 and L7. The motor N will now turn to lower the floor B uninterruptedly to the bottom of the shaft. When the floor reaches the bottom of the shaft, it opens switch S6, to stop the motor N. When the floor rises again (as will be explained presently), switch S6 again closes and S5 opens, switch S6 closing as soon as the floor begins to rise and switch S5 being opened by the floor.

Rising circuit (2)

This circuit is defined by the leads L10, L11, L12, L13, L14, L15, L16, L17, L18, L19, L20, L21 and L22. In series in this circuit are the switches S8, S7, S2, S13 and S12. Switch S8 is normally open, but is closed by a bundle upon the conveyor D. Switch S7 is normally closed, but is opened by the bundle. Switch S2 is normally open, but is closed by the carriage E when in inoperative position. Switch S13 is normally closed, but will be opened by the arm F when the latter rests upon the bundle lying on the floor B and, for some reason, the floor begins to rise instead of lowering. Switch S12 is normally closed, but is opened when the floor B reaches its fully raised or initial position to stop the motor N.

As the stack moves on the conveyor D, it opens switch S7, breaking the circuit. Immediately after clearing the switch S7, the bundle closes switch S8 to start the motor N. Should the carriage E tend to creep or advance toward the shaft structure C, switch S2 will open, stopping the motor. The switch S7 is so positioned with respect to the shaft structure that the motor will not start until the bundle is clear of the shaft structure C, that is, effectively out of the vertical path of the floor B.

Discharge conveyor circuit (3)

This circuit is defined by the leads L26, L27, L28, L29 and L30. In series in this circuit are switches S9 and S10. The switch S9, normally closed, is opened when the bundle is pushed over the switch by a following stack. Switch S10, normally open, is closed by the floor B when in fully lowered position, flush with the conveyor D.

Air shut-off valve circuit (4)

Switch S11 is in series in a circuit defined by leads L31, L32 and L33, this circuit being the starting circuit. This switch is normally open but is closed by the floor B when in fully raised position, ready to receive the first bundle. The switch S4, one of the switches referred to under the heading, "Adjustable limit switches," is in series in a parallel circuit defined by leads L34, L35 and the lead L33. This circuit is the holding circuit. Both circuits lead from a conventional magnetic contactor, Canadian Cutler-Hammer No. 9592 H-475, connected to power supply mains, shown as RS2. The contactor controls the shut-off valve V5 aforesaid.

When the floor B is fully raised, the starting circuit is closed, and of course the holding circuit is also closed since the switch S4 is closed, holding valve V5 in open position and admitting air from the source to the cylinder 59. After the floor B has begun lowering (with the first bundle), switch S11 opens but switch S4 is still closed, that is, the holding circuit is still made, so that the shut-off valve V5 remains open. When the floor has lowered sufficiently to cause switch S4 to open, the holding circuit is broken and valve V5 closes. On its upward movement, the floor B first closes switch S4 (switch S11 is still open), but the holding circuit is inoperative until the switch S11 is again closed by the floor when it reaches its fully raised position. As switch S11 again closes, the holding circuit becomes effective to hold the shut-off valve open.

OPERATION

When the device is idle, the carriage E is in retracted or inoperative position, away from the vertical conveyor shaft structure C; the vertical conveyor floor B is in raised position, ready to receive the first bundle or load; the gate H is in unlocked position, and slightly tilted, clear of the air bleeder valves V2 and V4; the control arm F is in lowered position, holding switch S1 open; disconnect switch SW is closed; and the combined brake and bundle stopping device G is in a position to stop the first bundle adjacent the shaft structure C, that is, in the position shown in Figure 16.

The first bundle is deposited upon the receiving conveyor A, upon which it moves freely until stopped adjacent the shaft structure C by the stop 41 of the device G. When so stopped, the weight of the bundle depresses the floating roller 14A and operates the air bleeder valve V3. As the valve V3 comes into operation, air is cut into the rear end of the cylinder 59, moving the carriage E toward the shaft structure and to its operative position overlying the floor B. As the carriage E moves toward its operative position, the control arm F swings upwardly to its horizontal position, ready to receive thereunder the first bundle. When in such operative position, the carriage E engages and operates the air bleeder valve V1. The operation of valve V1 cuts air into the top of the cylinder 35, operating the combined brake and stopping device G to release the first bundle but braking the rollers 14B of the receiving conveyor A. The second bundle is next deposited upon the conveyor A, the bundle coming to a stop above the rollers 14B because of the brake, which is now effective. The first bundle, being released, moves onto the carriage E. As the first bundle so moves, it engages the gate H, more particularly its members 100, swinging the gate on the axis of the shaft 102 away from the conveyor A, until the gate assumes a substantially vertical position when it becomes releasably locked in such position by the latch 110. The first bundle now comes to a stop against the gate. As the gate assumes its vertical position, locked as aforesaid, it actuates air bleeder valves V2 and V4, closing the normally open valve V2 and opening the normally closed valve V4. As the valve V4 opens, air is cut into the forward end of the cylinder 59, causing the carriage E to move back to its retracted or inoperative position. As the carriage moves back, the control arm F lowers, until its outer or free end rests upon the first bundle. As the carriage E about reaches its inoperative position, the arm 116 of the carriage E engages the latch 110, swinging the same to release or unlock the gate. The gate remains in its lowered position because of the bundle by which it is engaged. When the carriage E has moved back sufficiently to clear the bundle, the bundle drops onto the floor B. As the carriage E started on its return stroke, toward inoperative position, the valve V1, upon being released, caused the cylinder 35 to move the device G back to its normal position, thus releasing the rollers 14B and therefore, releasing the second bundle whereupon the second bundle proceeded toward the shaft structure C where it came to a stop. The floating roller 14A is again depressed and actuates the valve V3, but the valve is inoperative to control the movement of the carriage E since the valve V2 is held closed by the gate which is held in vertical position by the first bundle.

As the carriage reaches its inoperative position, it closes switch S3 and the motor M starts turning, thus lowering the floor B. As the control arm F reaches its lowered position, its free end gradually lowering with the first bundle, it opens switch S1 which cuts the circuit to the motor and operates a solenoid operated brake BR (not shown) to bring the motor to a stop, thereby bringing the floor B to a stop. At this stage, switch S3 is closed but switch S1 is open. As the first bundle lowers to clear the gate H, releasing the gate H, valve V4 closes but valve V2 opens; and as valve V3 was then open because of the second bundle, the carriage E now moves toward the shaft structure to its operative position, to receive the second bundle, therefore initiating a second cycle of operations since the engagement of the carriage E with valve V1 operates the device to release the second bundle, and so on.

When the desired number of bundles has been stacked upon the floor B, and the counterweights 137 have risen accordingly, switch S5 closes to complete the circuit to the motor N, so that the motor will turn independently of the control of the arm F and the floor will lower. When switch S5 so closes, the switch S4 opens, closing the shutoff valve V5. As already stated, V5 will next open when the floor B has again been raised to close switch S11. When the floor B reaches the bottom of the shaft structure C, it opens switch S6 and breaks the "Lowering circuit" to the motor N, thereby stopping the motor. As switch S6 opens, switch S12 is closed by the floor B. While the lowering circuit is broken, the discharge conveyor circuit is made, causing the motor N1 to turn and operate the discharge conveyor D. When the stack of bundles has travelled beyond switch S7 of the raising circuit, and closes switch S8 of the same circuit, the raising circut is now made and the floor B proceeds to rise. As the floor rises, switch S10 is opened, breaking the discharge conveyor circuit to stop motor N1. As the floor rises, it closes switch S5 and switch S4. Upon reaching its fully raised position, floor B opens the switch S12, breaking the raising circuit to stop the motor N.

What we claim is:

1. In a stacker and lowerer, the combination of a conveyor floor, a structure in which said floor rises and lowers, a carriage reciprocable between an operative position overlying said floor and a retracted position away from said structure, means for carrying a load toward said structure for loading upon said carriage when said carriage is in operative position, means for stopping the load adjacent said structure, and means operated by reciprocation of said carriage to operative position for operating said stopping means to release the load for loading onto said carriage and operated by reciprocation of said carriage from operative position for operating said stopping means to engage the load adjacent said structure.

2. In a stacker and lowerer, the combination of an upright structure, a floor adapted to lower and rise in said structure, a carriage reciprocable toward said structure to a position overlying said floor and away from said structure to a position clear of said floor, a conveyor including a plurality of rollers for carrying a load toward said structure for loading onto said carriage when said carriage is in operative position, a device operable to stop the load adjacent said structure and to release the load, alternately, a brake operated by said device to brake at least one of said rollers when the load is released by said stop device and to release said roller when the load is stopped by said stop device, and means operated by reciprocation of said carriage to operative position for operating said device to release the load for loading onto said carriage and operated by reciprocation of said carriage from operative position for operating said device to engage the load adjacent said structure.

3. In a stacker and lowerer, the combination of a floor, a structure in which said floor rises and lowers, a carriage reciprocable between an operative position overlying said floor and an inoperative position away from said structure, means on which a load is movable toward said structure for loading onto said carriage, means for stopping the load adjacent said structure, means controlled by the load for moving said carriage to operative position, means controlled by said carriage when in operative position for actuating said load-stopping means to release the load for loading onto said carriage, a pivoted gate engageable by one side of the load when upon said carriage for holding the load against movement with said carriage as the latter moves toward its inoperative position thereby to cause the load to drop onto said floor, means releasably locking said gate when engaged by the load, and means movable with said carriage for actuating said locking means to release said gate as said carriage moves toward inoperative position.

4. In a stacker and lowerer, the combination of a floor adapted to lower and rise, a carriage reciprocable between an operative position overlying said floor and an inoperative position spaced from said floor, means on which a load is movable for loading onto said carriage when in operative position, means engageable by the load for holding the load against movement with said carriage when the latter moves toward inoperative position thereby to cause the load to drop onto said floor, means including a motor for lowering and raising said floor, a circuit to said motor, a normally-open switch in said circuit operable by said carriage when in inoperative position to make the circuit to turn the motor to lower said floor, a control arm adapted to move between a raised position clear of the load and a lowered position, means between said carriage and said arm for moving said arm toward raised position as said carriage moves toward operative position, said last-named means permitting said arm to move toward lowered position to engage the top of the bundle to be lowered thereby as said carriage moves toward inoperative position, and a switch controlled by said arm when in lowered position to break said circuit when said floor has lowered a distance determined by the height of the load.

5. In a stacker and lowerer, the combination of a floor, a structure in which said floor lowers and rises, a carriage reciprocable between an operative position overlying said floor and an inoperative position spaced from said floor, powered means for reciprocating said carriage, means on which a load is movable for loading onto said carriage, a device operable to stop the load adjacent said structure when said carriage is in inoperative position and for subsequently releasing the load when said carriage is in operative position, means controlled by the load when stopped adjacent said structure for actuating said powered means to move said carriage to operative position, powered means for operating said device to release the load for loadig onto said carriage, a member engageable by one side of the load when upon said carriage to hold the load against movement with said carriage as said carriage moves toward inoperative position thereby to cause the load to drop onto said floor, means controlled by said member when engaged by the load to actuate said first powered means to move said carriage back to inoperative position, and means controlled by said member when engaged by the load to render said load-controlled means inoperative.

6. In a stacker and lowerer, the combination of a floor adapted to lower and rise, a carriage reciprocable between an operative position overlying said floor and an inoperative position spaced from said floor, means on which a load is movable for loading onto said carriage when in operative position, a movable member engageable by one side of the load for holding the load against movement with said carriage when said carriage moves toward inoperative position, powered means for moving said carriage between operative and inoperative positions, means controlled by the load prior to being moved onto said carriage for operating said powered means to move said carriage to operative position, means controlled by said member when the load is upon said carriage for operating said powered means to move said carriage back to inoperative position thereby causing the load to drop onto said floor, and a third means controlled by said member for rendering said first controlled means ineffective when said member is engaged by the load.

7. In a stacker and lowerer, the combination of a floor, a structure in which said floor is adapted to lower and rise, means including an electric motor for operating said floor, a carriage reciprocable between an operative position overlying said floor and an inoperative position spaced from said floor, powered means for reciprocating said carriage, means on which a load is movable for loading onto said carriage, a device operable to stop the load adjacent said structure and clear of said floor when said carriage is in inoperative position and subsequently to release the load when said carriage is in operative position, powered means for operating said device to release the load, means controlled by the load when stopped adjacent said structure to actuate said first powered means to move said carriage to operative position, a member engageable by one side of the load when upon said carriage to hold the load against movement with said carriage as the latter moves toward inoperative position, means controlled by said carriage when in operative position to actuate said second powered means to operate said device to release the load, means controlled by said member when engaged by the load to actuate said first powered means to move said carriage back to inoperative position thereby causing the load to drop onto said floor, means controlled by said member to render said load controlled means ineffective when said first member-controlled means is engaged by said member, a control arm adapted to be raised by said carriage when moving toward operative position to overlie the load on said floor and free to lower with the load when said carriage moves back toward inoperative position, a switch in the circuit to said motor operable by said carriage when in operative position to make the circuit, and a switch operable by said arm when lowered to break the circuit.

8. In a stacker and lowerer, the combination of a floor adapted to lower and rise, a carriage reciprocable between an operative position overlying said floor and an inoperative position spaced from said floor, means on which a load is movable for loading onto said carriage when in operative position, means engageable by one side of the load for holding the load against movement with said carriage when said carriage moves toward inoperative position thereby to cause the load to drop onto said floor, means including a motor for lowering and raising said floor, a normally-open switch in series with said motor adapted to be closed by said carriage when in inoperative position, a control arm adapted to move between a raised position clear of the load and a lowered position, means between said carriage and said arm for moving said arm toward raised position as said carriage moves toward operative position, said last-named means permitting said arm to move toward lowered position to engage the top of the load to be lowered thereby as said carriage moves toward inoperative position, a normally-closed switch in series with said first switch adapted to be opened by said arm when in lowered position, and a third switch in series with said first switch adapted to be operatively closed by said floor when lowering and operatively opened by said floor when rising.

9. In a stacker and lowerer as set forth in claim 8, means for adjustably supporting said third switch in the effective path of said floor to be operated thereby to selectively adjust the range of travel of said floor in accordance with the predetermined number of loads to be stacked.

10. In a stacker and lowerer, the combination of a shaft, a conveyor floor movable vertically in said shaft, a carriage reciprocable between an operative position overlying said floor and a retracted position away from said shaft, means for carrying a load toward said shaft for loading upon said carriage when in its operative position, means associated with said carrying means for stopping the load adjacent said shaft, means associated with said carrying means for arresting a load in advance of said stopping means, and means for alternately rendering said stopping means and said arresting means effective, said last-named means being operated by movement of said carriage to operative position for releasing said stopping means and operating said arresting means and effective upon withdrawal of said carriage from operative position for releasing said arresting means and operating said stopping means.

11. In a stacker and lowerer, the combination of a shaft in which a conveyor floor moves vertically, a carriage reciprocable between an operative position overlying said floor and a retracted position away from said shaft, a feeding conveyor for carrying a load toward said shaft for loading upon said carriage when in its operative position, a stop at the shaft end of said feeding conveyor for arresting movement of articles along said conveyor toward said shaft, means for reciprocating said carriage to and from its operative position, an article controlled device associated with said feeding conveyor adjacent said stop for operating said last-named means to move said carriage toward its operative position upon arrival of an article at said stop, and means actuated by movement of said carriage to its operative position for releasing said stop to permit loading of an article from said conveyor onto said carriage.

12. In a stacker and lowerer, the combination of a shaft in which a conveyor floor moves vertically, a carriage reciprocable between an operative position overlying said floor and a retracted position away from said shaft, a gate supported in said shaft above said carriage and arranged to be engaged by an article moving onto said carriage and shifted to operative position, means normally urging said gate toward an inoperative position, a latch for retaining said gate in operative position to engage the article during retraction of said carriage, and a device operated by movement of said gate to operative position by an article moving onto said carriage for operating said reciprocating means to withdraw said carriage from its operative position.

13. In a stacker and lowerer, the apparatus defined in claim 12 wherein said latch is released by movement of said carriage toward its inoperative position.

14. In a stacker and lowerer, the combination of a shaft, a conveyor floor movable vertically in said shaft, motor means for moving said floor vertically in said shaft, a carriage reciprocable to and from an operative position overlying said floor, means controlled by reciprocation of said carriage from operative position for actuating said motor means to initiate lowering movement of said floor, and a control arm mounted in the upper portion of said shaft above said carriage and arranged to engage the top of an article on said floor for controlling said motor means, said motor means being rendered inoperative upon movement of said control arm to a position where the top of an article on said floor is at a predetermined level in said shaft, whereby lowering movement of said floor is arrested with the top of the article on said floor at a predetermined level beneath said carriage.

15. In a stacker and lowerer, the combination of a shaft, a conveyor floor movable vertically in said shaft, motor means for moving said floor vertically in said shaft, a carriage reciprocable to and from an operative position overlying said floor, a control arm mounted in the upper portion of said shaft and arranged to overlie said floor and engage the top of an article thereon for controlling said motor means, means operated by reciprocation of said carriage toward operative position for raising said arm and operative upon movement of said carriage toward inoperative position for lowering said arm onto the top of an article on said floor, and a device rendered effective by said arm upon lowering of the top of the article on said floor to a predetermined level for arresting lowering movement of said floor by rendering said motor means inoperative.

16. In a stacker and lowerer, the combination of a shaft, a conveyor floor movable vertically in said shaft, a carriage reciprocable between an operative position overlying said floor and a retracted position away from said shaft, a control arm mounted in the upper portion of said shaft overlying said floor and arranged to engage the top of an article on said floor, means operated by movement of said carriage toward operative position for raising said arm and operated by movement of said carriage toward retracted position for lowering said arm, motor means for raising and lowering said floor in said shaft, a device operated by movement of said carriage to retracted position for rendering said motor means effective to initiate lowering movement of said floor, and a device operated by said control arm upon movement of the top of the article on said floor to a predetermined level for arresting lowering movement of said floor by rendering said motor means inoperative.

17. In a stacker and lowerer, the combination of a vertical shaft, a conveyor floor movable vertically in said shaft, a counterweight for said floor, control means engageable with an article on said floor for arresting downward movement thereof, switch means controlled by said counterweight upon lowering of the floor to a predetermined position for causing continued lowering movements of said floor, and switch means operated by said counterweight upon raising of said floor to a predetermined position for arresting further raising movement of the floor.

18. In a stacker and lowerer, the combination of a shaft, a conveyor floor movable vertically in said shaft, motor means for moving said floor vertically in said shaft, a carriage reciprocable to and from an operative position overlying said floor, means controlled by reciprocation of said carriage from operative position for initiating operation of said motor means to lower said floor, a control arm pivotally mounted in the upper portion of said shaft and arranged to engage the top of an article on said floor, and means operated by movement of said control arm during descent of said floor for rendering said motor means inoperative with the top of an article on said floor at a predetermined level in said shaft.

19. In a stacker and lowerer, the combination of a shaft, a conveyor floor movable vertically in said shaft, motor means for moving said floor vertically in said shaft, a carriage reciprocable to and from an operative position overlying said floor, a control arm mounted in the upper portion of said shaft and shiftable to and from an operative position to engage the top of an article on said floor, means operated by retraction of said floor for shifting said arm to operative position, said motor means being rendered inoperative upon movement of said control arm while in engagement with the top of an article on said floor to a position with the top of said article at a predetermined level in said shaft, whereby lowering movement of said floor is arrested with the top of the article on said floor at a predetermined level beneath said carriage.

20. In a stacker and lowerer, the combination of a shaft, a conveyor floor movable vertically in said shaft, motor means for moving said floor vertically in said shaft, a carriage reciprocable to and from an operative position overlying said floor, a control arm mounted in the upper portion of said shaft, means operated by movement of said carriage to and from its operative position for shifting said control arm between an operative position arranged to engage the top of an article on said floor and an inoperative position spaced from said article, and means operated by movement of said control arm when in its operative position in engagement with the top of an article on said floor during descent of said floor for rendering said motor means inoperative with the top of the article on said floor at a predetermined level in said shaft beneath said carriage.

21. In a stacker and lowerer, the combination of a shaft, a conveyor floor movable vertically in said shaft, motor means for moving said floor vertically in said shaft, a carriage reciprocable to and from an operative position overlying said floor, a control arm mounted in the upper portion of said shaft and arranged to engage the top of an article on said floor for controlling said motor means, said motor means being rendered inoperative upon movement of said control arm to a position where the top of an article on said floor is at a predetermined level in said shaft, and a device responsive to descent of said floor to a predetermined level in said shaft for continuing operation of said motor means to lower said floor to the bottom of said shaft when a stack of articles on said floor reaches a predetermined height.

22. In a stacker and lowerer, the apparatus defined in claim 21 wherein said device for continuing operation of said motor means is adjustable to vary the height of the stack of articles accumulated on said floor.

References Cited in the file of this patent

UNITED STATES PATENTS

| | | |
|---|---|---|
| 944,946 | Clark | Dec. 28, 1909 |
| 1,020,746 | Dehler | Mar. 19, 1912 |
| 1,349,450 | French, et al. | Aug. 10, 1920 |
| 1,556,438 | Hanson et al. | Oct. 6, 1925 |
| 1,661,969 | Semashko | Mar. 6, 1928 |
| 1,849,385 | Sekulski | Mar. 15, 1932 |
| 2,065,673 | Fay, Jr. | Dec. 29, 1936 |
| 2,065,674 | Fay, Jr. | Dec. 29, 1936 |
| 2,113,926 | Pierce | Apr. 12, 1938 |
| 2,228,887 | Peterson | Jan. 14, 1941 |
| 2,565,927 | Morgan | Aug. 28, 1951 |
| 2,633,251 | Bruce | Mar. 31, 1953 |